United States Patent
Suomela et al.

(10) Patent No.: US 9,659,700 B2
(45) Date of Patent: May 23, 2017

(54) NEUTRALIZING EXTERNAL MAGNETIC FORCES ON AN OIS MODULE

(71) Applicant: Microsoft Technology Licensing, LLC, Redmond, WA (US)

(72) Inventors: Juha Suomela, Aura (FI); Mika Viitikko, Ilmarinen (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/859,805

(22) Filed: Sep. 21, 2015

(65) Prior Publication Data

US 2017/0084374 A1    Mar. 23, 2017

(51) Int. Cl.
*H04N 5/228* (2006.01)
*H01F 13/00* (2006.01)
*H04N 5/232* (2006.01)

(52) U.S. Cl.
CPC ....... *H01F 13/006* (2013.01); *H04N 5/23287* (2013.01)

(58) Field of Classification Search
CPC .......... G02B 27/646; G03B 2205/0015; G03B 2205/0069; G03B 5/00
See application file for complete search history.

(56) References Cited

U.S. PATENT DOCUMENTS

| | | | |
|---|---|---|---|
| 8,041,201 B2 | 10/2011 | Eromaki et al. | |
| 8,670,195 B2 * | 3/2014 | Ikushima | G02B 27/646 359/814 |
| 8,912,873 B2 | 12/2014 | Kuivallainen et al. | |
| 2008/0198462 A1 | 8/2008 | Sekino | |
| 2009/0067827 A1 | 3/2009 | Yoshida et al. | |
| 2009/0251777 A1 | 10/2009 | Suzuki | |
| 2011/0102117 A1 * | 5/2011 | Chiolerio | B82Y 25/00 335/302 |
| 2011/0150441 A1 | 6/2011 | Ollila et al. | |
| 2011/0158616 A1 | 6/2011 | Chiang | |
| 2013/0044382 A1 * | 2/2013 | Phoon | H04N 5/2253 359/824 |
| 2013/0104410 A1 | 5/2013 | Wade et al. | |

(Continued)

FOREIGN PATENT DOCUMENTS

| | | |
|---|---|---|
| JP | 2012209735 A | 10/2012 |
| JP | 2013254184 A | 12/2013 |

(Continued)

OTHER PUBLICATIONS

Rosa, et al., "Optical Image Stabilization (OIS)", In White Paper, Jun. 22, 2015, 26 pages.

(Continued)

*Primary Examiner* — Amy Hsu

(57) ABSTRACT

A device is disclosed, comprising a camera comprising an optical image stabilization module, at least one magnetic component, at least one ferromagnetic component, wherein the at least one ferromagnetic component is disposed at a position so as to develop a magnetic force between the optical image stabilization module of the camera and the ferromagnetic component which acts in a direction opposite to a magnetic force exerted on the optical image stabilization module by the at least one magnetic component.

20 Claims, 5 Drawing Sheets

(56) References Cited

U.S. PATENT DOCUMENTS

| | | | |
|---|---|---|---|
| 2014/0009631 A1* | 1/2014 | Topliss | G02B 27/646 348/208.11 |
| 2014/0146392 A1* | 5/2014 | Fujinaka | G02B 27/646 359/557 |
| 2014/0285678 A1 | 9/2014 | Jeong | |
| 2015/0077628 A1 | 3/2015 | Kim et al. | |
| 2015/0124331 A1* | 5/2015 | Fujinaka | G02B 7/022 359/700 |
| 2016/0018720 A1* | 1/2016 | Bachar | G02B 7/08 359/824 |
| 2016/0142634 A1* | 5/2016 | You | G03B 29/00 348/208.2 |
| 2016/0209618 A1* | 7/2016 | Avivi | G03B 3/10 |

FOREIGN PATENT DOCUMENTS

| | | |
|---|---|---|
| WO | 2008061549 A1 | 5/2008 |
| WO | 2014157998 A1 | 10/2014 |

OTHER PUBLICATIONS

"International Search Report and Written Opinion Issued in PCT Application No. PCT/US2016/045944", Mailed Date: Nov. 7, 2016, 11 Pages.

* cited by examiner

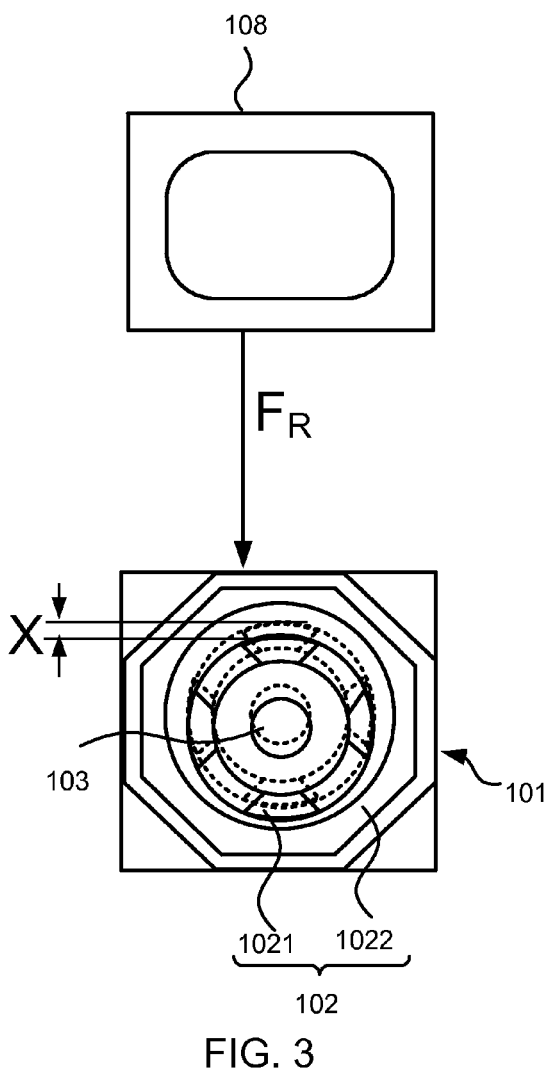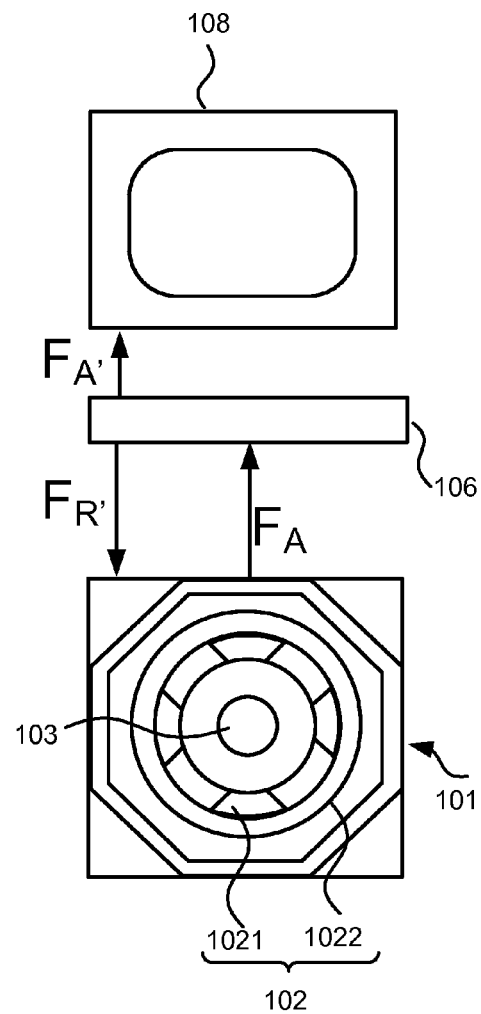
FIG. 3
FIG. 4

NEUTRALIZING EXTERNAL MAGNETIC FORCES ON AN OIS MODULE

BACKGROUND

Cameras are ubiquitous in devices such as mobile feature phones, smartphones, tablet computers, digital cameras etc. Image distortions may occur if a device capturing the image is subject to sudden movements during image capture. This may, for example, occur due to involuntary shaking of a user's hand while using the device. Image stabilization techniques may be utilized to ameliorate possible image distortions caused by such movements. Images may be stabilized digitally after capture or optical elements of a camera may be stabilized to obtain distortion free images. Stabilizing the optical elements of a camera to obtain distortion free images may be referred to as Optical image stabilization (OIS). Optical image stabilization may involve maintaining the position of a lens assembly and/or a sensor of a camera. An optical image stabilization module may be configured with a camera. Such a module may use various sensors and actuators to detect and compensate for sudden movements. The actuators may comprise magnetic components like permanent magnets and/or electromagnetic coils. A device capable of capturing images may also comprise magnetic components, for example, a microphone or a speaker. A microphone or a speaker may comprise a permanent magnet. The magnetic fields from a magnetic component and an optical image stabilization module may interact if the component is disposed within a certain area around the camera comprising the optical image stabilization (OIS) module.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A device comprising a camera and at least one magnetic component is described. In an embodiment, a device is disclosed, the device comprises, a camera, at least one magnetic component, and at least one ferromagnetic component; the camera comprising an Optical Image Stabilization (OIS) module. The at least one magnetic component may exert a force on the optical image stabilization module and the at least one ferromagnetic component may be disposed at such a position so that a magnetic force develops between the ferromagnetic component and the optical image stabilization module, the developed force acting opposite to a force exerted by the at least one magnetic component.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein:

FIG. 3 illustrates a repulsive magnetic force exerted by a magnetic component on an OIS module and the resultant displacement of the lens assembly, according to an embodiment;

FIG. 4 illustrates the effect of introduction of a ferromagnetic component on the forces exerted on the OIS module, according to an embodiment;

Figure 6:
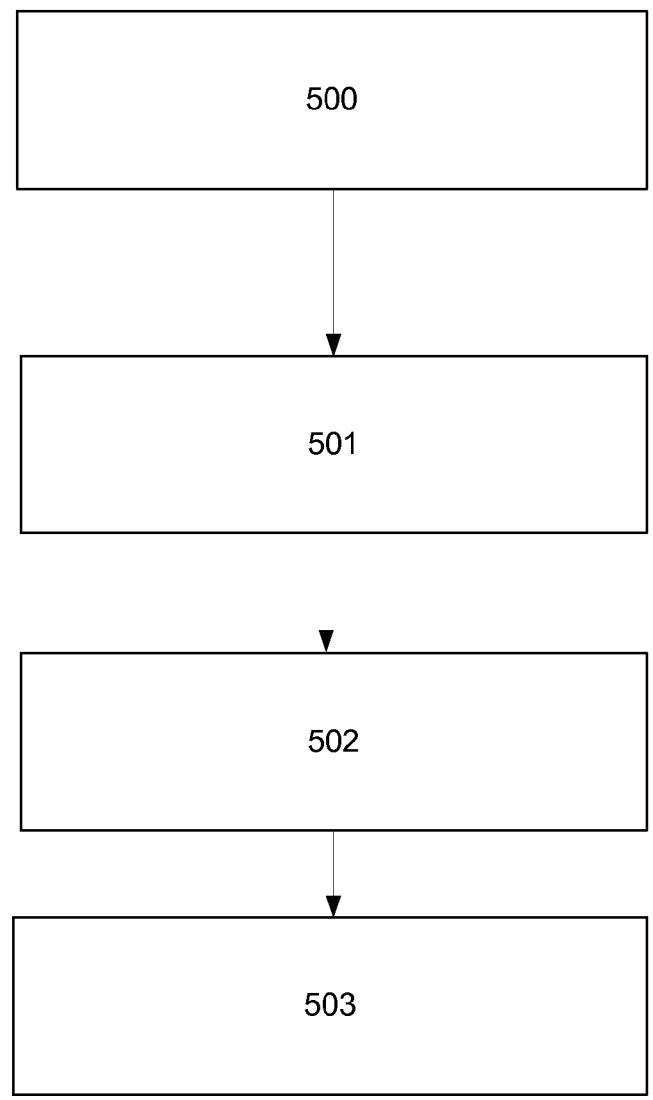

and;

FIG. 6 illustrates a schematic flow chart of a method of cancelling the magnetic force exerted on an OIS module in accordance with an embodiment.

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Although the embodiments may be described and illustrated herein as being implemented in a smartphone, this is only an example implementation and not a limitation. As those skilled in the art will appreciate, the present embodiments are suitable for application in a variety of different types of devices comprising magnetic components and at least one camera with an OIS module, for example digital cameras, tablet computers, smart cameras etc.

Figure 1:
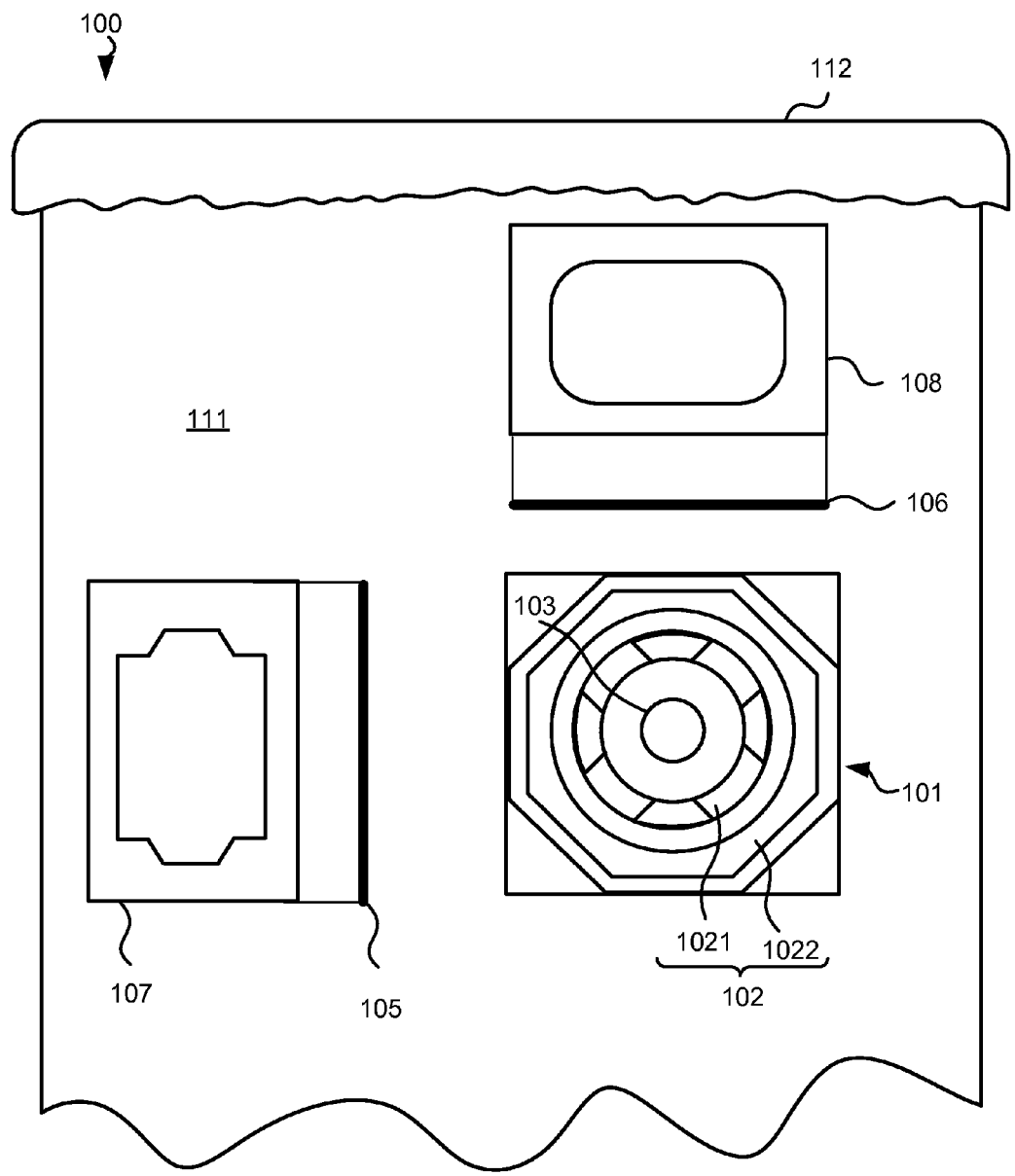
FIG. 1 exemplarily illustrates a top view of a device comprising a camera, an earphone, an inbuilt hands-free and two ferromagnetic components disposed on a Printed Circuit Board (PCB) according to an embodiment.

FIG. 1 illustrates a device according to an embodiment. The device 100 may comprise a cover 112, at least one printed circuit board (PCB) 111, a camera 101, an in built hands-free 108, an ear-piece 107 and ferromagnetic components 105 and 106. The camera may comprise a lens assembly 103, a sensor (not illustrated in FIG. 1) and an Optical Image Stabilization (OIS) module 102. The built in hands-free 108 and ear-piece 107 each may comprise one or more magnets (not illustrated in FIG. 1). According to an embodiment, the OIS module 102 may comprise two portions, an inner portion 1021 configured to envelope the lens assembly and an outer portion 1022 configured to envelope the inner portion 1021 leaving a concentric margin to allow the inner portion 1021 and the lens assembly 103 to be adjusted to compensate for any movements of the device during image capture.

Referring to an embodiment illustrated in FIG. 1, a camera 101 may be disposed on the PCB 111 so that at least the aperture can be exposed through a device cover 112. The OIS module 102 may comprise actuators to enable movement of lens assembly 103 to compensate for sudden movements of the device 100 during image capture. The inbuilt hands-free 108 and ear-piece 107 may be configured on the PCB 111 to allow acoustic communication across the device cover 112. Inbuilt hands-free 108 and ear-piece 107 may comprise permanent magnets to be able to convert electrical signals to audio signals. The inbuilt hands-free 108 and ear-piece 107 may be configured in proximity to the camera 101. The ferromagnetic component 106 may be configured between the inbuilt hands-free 108 and the camera 101. The ferromagnetic component 105 may be configured between the ear piece 107 and the camera 101.

Although the embodiments may be described and illustrated herein as being implemented on a printed circuit board or PCB, it is for illustrative purposes only and not intended as a limitation. As those skilled in the art will appreciate the term PCB may be intended to include all structures that may mechanically support and/or electrically connect electric and electronic components. Examples of such structures may include: Printed Wire Boards (PWB), Printed Circuit Assemblies (PCA), Printed Circuit Board Assemblies (PCBA), Circuit Card Assemblies (CCA), Flexible Circuit Boards (FCB) etc.

Referring to an embodiment illustrated in FIG. 1, the magnetic components: earphone 107 and/or inbuilt hands-free 108 may exert magnetic forces on the magnetic components of OIS module 102 of camera 101. These forces may displace inner portion of the OIS module 1021 and lens assembly 103 from their normal resting position. A normal resting position may be a position of the components of OIS module 102 under influence of only the earths' magnetic field and in absence of any movement of the device. Magnetic forces may develop between ferromagnetic components 105 and/or 106 and the OIS module. These magnetic forces may be opposite to those exerted by magnetic components 107 and/or 108. According to an embodiment, the opposing forces may be substantially equal. This may prevent displacement of inner portion 1021 of OIS module 102 and lens assembly 103 of camera 101 from their desired resting position. The position of the ferromagnetic components 105 and/or 106 may be chosen so as to develop magnetic interaction between OIS module 102 and ferromagnetic components 105 and/or 106 to a level which is enough to generate forces between OIS module 102 and ferromagnetic components 105 and/or 106 so that the forces so developed are substantially equal and acting opposite to the forces exerted by magnetic components 107 and/or 108 on the OIS module. According to an embodiment, the ferromagnetic components 105 and 106 may be substantially lamellar in shape. According to an embodiment, at least one of the ferromagnetic components 105 and/or 106 may be rectangular in shape, positioned such that its planar faces is transversal to a line joining the OIS module 102 to the corresponding magnetic component. According to an embodiment, the planar face may be perpendicular with respect to a line between the center of OIS module 102 and center of one of the corresponding magnetic components 107 or 108.

Referring to FIG. 1, according to an embodiment, the ferromagnetic component 105 may contribute to neutralize magnetic forces exerted by at least one permanent magnet of ear-piece 107 on OIS module 102. According to an embodiment, the ferromagnetic component 106 may contribute to neutralize magnetic forces exerted by at least one permanent magnet of inbuilt hands-free 108 on OIS module 102. According to an embodiment, this cancellation of magnetic forces may prevent displacement of the lens assembly from its normal resting position. According to an embodiment, neutralizing the magnetic forces exerted on the camera 101 by permanent magnets of ear-piece 107 and/or inbuilt hands-free 108 may prevent the current in OIS module coils from reaching the maximum allowable values. According to an embodiment, neutralizing the magnetic forces exerted on camera 101 by permanent magnets of ear-piece 107 and/or inbuilt hands-free 108 may result in improved performance of OIS module actuators. According to an embodiment, the performance gains may be in a control loop or impulse response of the OIS actuators (not illustrated in FIG. 1). According to another embodiment, neutralizing the magnetic forces exerted on camera 101, by permanent magnets of ear-piece 107 and/or inbuilt hands-free 108 may improve the camera sensor performance. According to another embodiment, neutralizing the magnetic forces exerted on camera 101, by permanent magnets of ear-piece 107 and/or inbuilt hands-free 108 may reduce the heat generated in OIS module coils. Original equipment manufacturers of cameras may specify a minimum distance from the camera where magnetic components may be disposed. According to an embodiment, neutralizing the magnetic forces exerted on camera 101, by permanent magnets of ear-piece 107 and/or inbuilt hands-free 108 may allow disposing ear-piece 107 and/or inbuilt hands-free 108, closer to the camera 101, than specified by their original equipment manufacturer. This may improve utilization of available space on the PCB 111.

According to an embodiment device 100 may comprise only one of the magnetic components: ear-piece 107 or inbuilt hands-free 108 and the corresponding ferromagnetic component 105 or 106.

Although the embodiments may be described and illustrated herein as being implemented with respect to an optical image stabilization module comprising two physically distinct portions, this is only an example illustration and not a limitation. As those skilled in the art will appreciate, the embodiments disclosed herein are suitable for OIS modules which use magnetic actuators for movement of the lens assembly or the image sensor. Such OIS modules may be of different varieties and may comprise one or more physically distinct portions.

Figure 2:
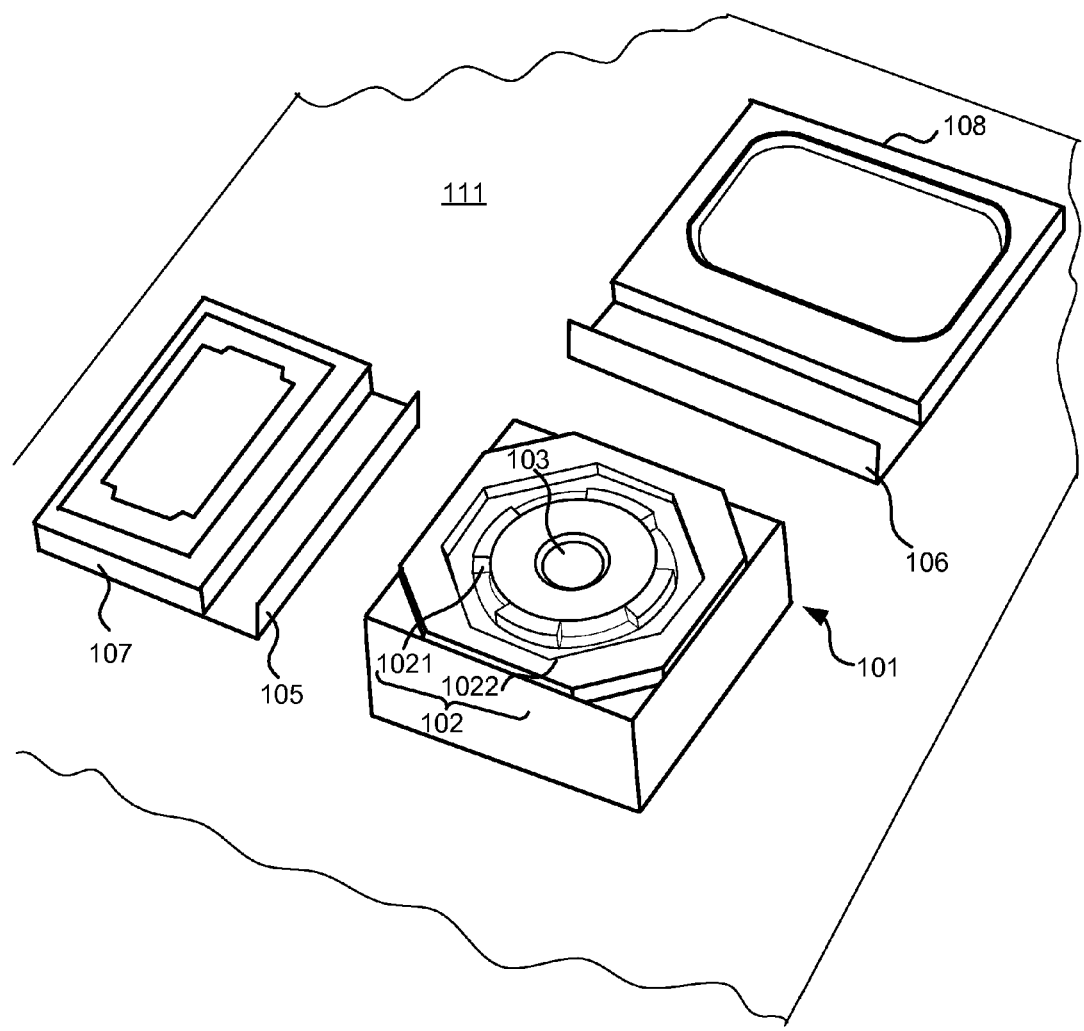
FIG. 2 illustrates a perspective view of a device comprising a camera, an earphone, an inbuilt hands-free and two ferromagnetic components according to an embodiment.

FIG. 2 illustrates a perspective view of a device illustrated in FIG. 1. According to an embodiment, the ferromagnetic component 105 may be configured to be attached to or be a part of a casing of the component 107. According to an embodiment, the ferromagnetic component 106 may be configured to be structurally attached to or be a part of a casing of the component 108. According to an embodiment, the separation between the ear-piece 107 and the ferromagnetic component 105 may be one millimeter. According to an embodiment, the separation between the inbuilt hands-free 108 and the ferromagnetic component 106 may be one millimeter. According to an embodiment, the separation between the ear-piece 107 or the inbuilt hands free 108 and the corresponding ferromagnetic component 105 or 106 may be of the order of a few millimeters. According to an embodiment, the height of ferromagnetic components 105 and 106 may be determined on the basis of at least one of: magnetic properties of the inbuilt hands-free 108; the magnetic properties of earpiece 107; magnetic properties of the OIS module 102; and dimensions of the device. According to an embodiment, the ferromagnetic components 105 and 106 may not be structurally attached to ear piece 107 and inbuilt hands-free 108 respectively.

FIG. 3 illustrates some possible magnetic forces, in a simplified manner, in a device 100 in absence of a ferromagnetic component, according an embodiment. A repulsive force $F_R$ may be exerted by a magnetic component, for example an inbuilt hands-free 108, on a camera 101, in particular an OIS module 102 of camera 101. The repulsive force may cause a displacement "X" of the inner portion 1021 of the OIS module 102, and the lens assembly 103 it envelopes, from their normal resting position. According to an embodiment, the displacement X from the normal resting position of the inner portion 1021 may be of the order of 100 μm. According to an embodiment, this displacement X from normal resting position of the lens assembly 103 may reduce the available range of lens assembly adjustment for image stabilization. Further this displacement X may cause current coils (not illustrated in FIG. 3) of the actuators comprising OIS module 102 to need more current to affect movement of the inner portion 1021 of the OIS module 102 for image stabilization.

FIG. 4 illustrates some possible magnetic forces, in a simplified manner, in a device 100 in presence of a ferromagnetic component 106 according to an embodiment. An inbuilt hands-free 108 may magnetize a portion of the ferromagnetic component 106, so that an attractive force $F_A'$ may develop between the inbuilt hands-free 108 and the ferromagnetic component 106. The portion of ferromagnetic component 106 so magnetized by inbuilt hands-free 108 may exert a repulsive force $F_R'$ on the OIS module 102. The magnets (not illustrated in FIG. 4) in OIS module 102 may magnetize a portion of ferromagnetic component 106 so that an attractive force $F_A$ may develop between ferromagnetic component 106 and OIS module 102. Ferromagnetic component 106 may be disposed at a position so that the attractive force $F_A$ so developed may be substantially equal to repulsive force $F_R'$.

Figure 5:
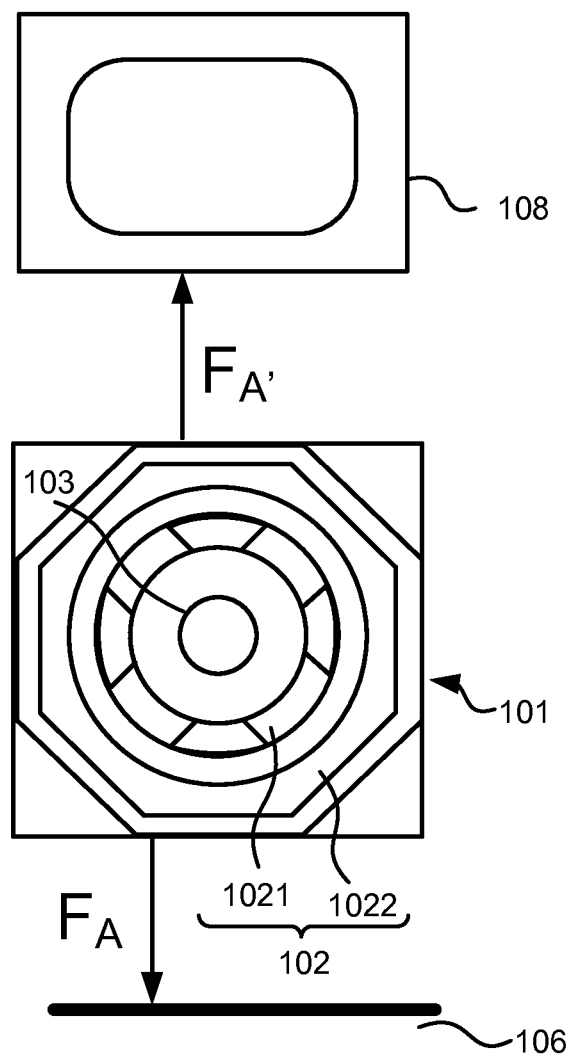
FIG. 5 illustrates disposition of a ferromagnetic component to cancel magnetic forces exerted on an OIS module according to an embodiment.

FIG. 5 illustrates disposition of a ferromagnetic component 106 and simplified possible magnetic forces acting on camera module 101, in particular OIS module 102 according to an embodiment. A magnetic component, for example an inbuilt hands-free 108 may exert an attractive force $F_A'$ on the OIS module 102. This force, if left unbalanced, may displace inner portion 1021 and the lens assembly 103 it envelopes from its resting position. Ferromagnetic component 106 may be disposed on a side of OIS module 102, which is opposite to the side facing magnetic component 108. The magnets in OIS module 102 may magnetize ferromagnetic component 106 so that an attractive force $F_A$ develops between OIS module 102 and ferromagnetic component 106 in a direction opposite to the direction of $F_A'$. The ferromagnetic component 106 may be disposed at such a position so that the force $F_A$ is substantially equal to force $F_A'$.

It should be noted that the forces illustrated in FIG. 3, FIG. 4 and FIG. 5 are illustrative examples only. Any number, direction, and magnitude of the forces illustrated herein is by way of example and should in no way be construed as being restrictive.

FIG. 6 illustrates, as a schematic flow chart, a method of neutralizing magnetic forces exerted on an IOS module by magnetic components in a device comprising an OIS enabled camera and at least one magnetic component, in accordance with an embodiment. Referring to FIG. 6, according to an embodiment the process comprises steps 500, 501, 502 and 503. According to an embodiment, the process of FIG. 6 may be compiled into program code for a computing device to execute.

Step 500 may comprise determining the magnetic force exerted by the at least one magnetic component on the OIS module. The magnetic component may be any component comprising a magnet strong enough to interact with magnetic components comprising an IOS module. According to an embodiment, the magnetic component may include inbuilt hands free, an earpiece, a play back speaker, a microphone etc.

Step 501 may comprise determining a position for a ferromagnetic component on the PCB on which a camera and a magnetic component are configured. The position may be chosen so that a force is developed between the magnetic component and OIS module which substantially cancels the magnetic force exerted by the magnetic component on the OIS module. The position may be determined either by mathematical models or by physical measurement and may depend upon direction and strength of the magnetic field produced by a magnetic component and location of the magnetic component with respect to the camera. Step 501 may further include determining the dimensions of the ferromagnetic component. In an embodiment, the vertical dimensions of the component may be determined. In another embodiment, the horizontal dimensions, length of the ferromagnetic component or width of the component or both may be determined. In yet another embodiment, all the dimensions may be determined. In an embodiment, the determination of dimensions may be based upon strength and/or direction of the magnetic field from the magnet of a magnetic component. In an embodiment, the determination of dimensions may be based upon the determined position for the ferromagnetic component.

Step 502 may comprise placing the ferromagnetic component at the determined position on the PCB. In step 503, the ferromagnetic component may be attached to the PCB. The attachment may be affected in various ways like gluing, soldering etc. In an embodiment, the ferromagnetic component may be attached as an outward projection to a casing of the magnetic component.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store, parts or all of, an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The term 'computer', 'computing device', 'apparatus' or 'terminal' or 'local terminal' is used herein to refer to any apparatus with processing capability such that it can execute instructions. Those skilled in the art will realize that such processing capabilities are incorporated into many different devices and therefore the terms 'computer' and 'computing device' each include PCs, servers, industrial controllers etc., which may be capable of computer-integrated manufacturing or computer-aided manufacturing etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

According to an embodiment, a device is disclosed, the device comprising: a camera comprising an optical image stabilization module; at least one magnetic component external to the camera; at least one ferromagnetic component; wherein the at least one magnetic component exerts a magnetic force on the optical image stabilization module and the at least one ferromagnetic component is disposed at a position so that a magnetic force develops between ferromagnetic component and the optical image stabilization module which acts in a direction opposite to the force exerted by the at least one magnetic component.

In an embodiment, alternatively or in addition to the above described embodiments, the magnetic component comprises one of: an earpiece, an inbuilt hands-free or a microphone.

In an embodiment, alternatively or in addition to the above described embodiments, the magnetic component exerts a net repulsive force on the optical image stabilization module and the ferromagnetic component is disposed between the camera and the magnetic component.

In an embodiment, alternatively or in addition to the above described embodiments, the magnetic component exerts a net attractive force on the optical image stabilization module and the ferromagnetic component is disposed diametrically opposite to the ferromagnetic component the camera module.

In an embodiment, alternatively or in addition to the above described embodiments, the optical image stabilization module is configured to stabilize a lens assembly of the camera, an image sensor of the camera or both.

In an embodiment, alternatively or in addition to the above described embodiments, the ferromagnetic component comprises a vertical portion and a horizontal portion, wherein the horizontal portion is configured to be attached to a printed wire board.

In an embodiment, alternatively or in addition to the above described embodiments, the horizontal portion of the ferromagnetic component is shorter in length than the vertical portion.

In an embodiment, alternatively or in addition to the above described embodiments, the height of the vertical portion is determined based on at least one of: magnetic characteristics of the optical image stabilization module, magnetic characteristics of the magnetic component, available space and dimensions of the device.

In an embodiment, alternatively or in addition to the above described embodiments, the magnetic component is configured at a distance from the camera which is lesser than a minimum distance between the camera and the magnetic component specified by the camera original equipment manufacturer.

In an embodiment, alternatively or in addition to the above described embodiments, the ferromagnetic component comprises a portion which covers at least a part of the magnetic component, a portion which extends along the printed circuit board away from the magnetic component and towards the camera and a vertical portion which rises vertically to a certain height.

In an embodiment, alternatively or in addition to the above described embodiments, the position of the ferromagnetic component is determined based on at least one of: magnetic characteristics of the optical image stabilization module, magnetic characteristics of the magnetic component, available space and dimensions of the device.

In an embodiment, alternatively or in addition to the above described embodiments, the dimensions of the ferromagnetic component are determined based upon at least one of: magnetic characteristics of the optical image stabilization module; magnetic characteristics of the magnetic component; available space; and dimensions of the device.

In an embodiment, alternatively or in addition to the above described embodiments, the magnetic force developed between the ferromagnetic component and the optical stabilization module is so as to maintain at least one component of an optical image stabilization module at its normal resting position.

In an embodiment, alternatively or in addition to the above described embodiments, the magnetic force developed between the ferromagnetic component and the optical stabilization module is equal to the force exerted by the magnetic component on the optical stabilization module.

An aspect discloses a mobile device, the mobile device comprising a camera comprising an optical image stabilization module; at least one magnetic component external to the camera; at least one substantially lamellar ferromagnetic component; wherein the at least one magnetic component exerts a force on the optical image stabilization module and the at least one ferromagnetic component is disposed at a position so that a magnetic force develops between ferromagnetic component and the optical image stabilization module which acts in a direction opposite to the force exerted by the at least one magnetic component.

In an embodiment, alternatively or in addition to the above described embodiments, the magnetic component comprises one of: an earpiece, an inbuilt hands-free or a microphone.

In an embodiment, alternatively or in addition to the above described embodiments, the magnetic component comprises one of: an earpiece, an inbuilt hands-free or a microphone.

In an embodiment a method is disclosed, the method comprising determining a magnetic force exerted by a magnetic component external to a camera on an optical image stabilization module comprising the camera, the camera and magnetic component being attached to a printed circuit board; determining a position for a ferromagnetic component on the printed circuit board; placing a ferromagnetic component at the determined position on the printed circuit board; attaching the ferromagnetic component at the determined position to the printed circuit board; wherein the position determined for the ferromagnetic component is so that a magnetic force develops between the ferromagnetic component and the optical image stabilization module which acts opposite in direction to the force exerted on the optical image stabilization module by the magnetic component.

In an embodiment, alternatively or in addition to the above described embodiments, further determining a suitable thickness of the ferromagnetic component before placing on the printed circuit board.

In an embodiment, alternatively or in addition to the above described embodiments, the magnetic force developed between the ferromagnetic component and the optical stabilization module is so as to maintain the resting position of at least one component comprising the optical image stabilization module.

The invention claimed is:

1. A device comprising:
    a camera comprising an optical image stabilization module;
    at least one magnetic component external to the camera; and
    at least one ferromagnetic component;
        wherein the at least one magnetic component exerts a magnetic force on the optical image stabilization module and the at least one ferromagnetic component is disposed at a position so that another magnetic force developed between the at least one ferromagnetic component and the optical image stabilization module acts in a direction opposite to the magnetic force exerted by the at least one magnetic component.

2. The device of claim 1, wherein the magnetic component comprises one of: an earpiece, an inbuilt hands-free or a microphone.

3. The device of claim 1, wherein the magnetic component exerts a net repulsive force on the optical image stabilization module and the ferromagnetic component is disposed between the camera and the magnetic component.

4. The device of claim 1, wherein the magnetic component exerts a net attractive force on the optical image stabilization module and the ferromagnetic component is disposed on a side of the camera module which is diametrically opposite to the magnetic component.

5. The device of claim 1, wherein the optical image stabilization module is configured to stabilize a lens assembly of the camera, an image sensor of the camera or both.

6. The device of claim 1, wherein the ferromagnetic component comprises a vertical portion and a horizontal portion, wherein the horizontal portion is configured to be attached to a printed wire board.

7. The device of claim 6, wherein the horizontal portion of the ferromagnetic component is shorter in length than the vertical portion.

8. The device of claim 6, wherein the height of the vertical portion is determined based on at least one of: magnetic characteristics of the optical image stabilization module, magnetic characteristics of the magnetic component, available space and dimensions of the device.

9. The device of claim 1, wherein the magnetic component is configured at a distance from the camera which is lesser than a minimum distance between the camera and the magnetic component specified by the camera original equipment manufacturer.

10. The device of claim 1, wherein the at least one ferromagnetic component comprises a portion which covers at least a part of the magnetic component, a portion which extends along the printed circuit board away from the magnetic component and towards the camera and a vertical portion which rises vertically to a certain height.

11. The device of claim 1, wherein the position of the at least one ferromagnetic component is determined based on at least one of: magnetic characteristics of the optical image stabilization module, magnetic characteristics of the magnetic component, available space and dimensions of the device.

12. The device of claim 1, wherein the dimensions of the at least one ferromagnetic component are determined based upon at least one of: magnetic characteristics of the optical image stabilization module; magnetic characteristics of the magnetic component; available space; and dimensions of the device.

13. The device of claim 1, wherein the other magnetic force developed between the at least one ferromagnetic component and the optical stabilization module maintains at least one component of an optical image stabilization module at its normal resting position.

14. The device of claim 1, wherein the other magnetic force developed between the at least one ferromagnetic component and the optical stabilization module is equal to the magnetic force exerted by the magnetic component on the optical stabilization module.

15. A mobile device comprising:
    a camera comprising an optical image stabilization module;
    at least one magnetic component external to the camera; and
    at least one substantially lamellar ferromagnetic component;
wherein the at least one magnetic component exerts a force on the optical image stabilization module and the at least one ferromagnetic component is disposed at a position so that a magnetic force develops between the at least one ferromagnetic component and the optical image stabilization module which acts in a direction opposite to the force exerted by the at least one magnetic component.

16. The device of claim 15, wherein the magnetic component comprises one of: an earpiece, an inbuilt hands-free or a microphone.

17. The device of claim 15, wherein the magnetic force developed between the at least one ferromagnetic component and the optical image stabilization module prevents displacement of the optical image stabilization module from its resting position due to the force from the at least one magnetic component.

18. A method comprising:
  determining a magnetic force exerted by a magnetic component external to a camera on an optical image stabilization module included in the camera, the camera and the magnetic component being attached to a printed circuit board;
  determining a position for a ferromagnetic component on the printed circuit board;
  placing at least one ferromagnetic component at the determined position on the printed circuit board; and
  attaching the at least one ferromagnetic component at the determined position to the printed circuit board;
  wherein the position determined for the ferromagnetic component is so that another magnetic force develops between the ferromagnetic component and the optical image stabilization module which acts opposite in direction to the determined magnetic force exerted on the optical image stabilization module by the magnetic component.

19. The method of claim 18, further comprising: determining a suitable thickness of the ferromagnetic component before placing on the printed circuit board.

20. The method of claim 18, wherein the magnetic force developed between the ferromagnetic component and the optical stabilization module is so as to maintain the resting position of at least one component comprising the optical image stabilization module.

* * * * *